US008009965B2

(12) United States Patent
Takao

(10) Patent No.: US 8,009,965 B2
(45) Date of Patent: Aug. 30, 2011

(54) VIDEO ANALYZER AND COMPUTER PROGRAM PRODUCT

(75) Inventor: Yuji Takao, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 222 days.

(21) Appl. No.: 12/487,617

(22) Filed: Jun. 18, 2009

(65) Prior Publication Data

US 2010/0134691 A1   Jun. 3, 2010

(30) Foreign Application Priority Data

Nov. 28, 2008   (JP) ................................. 2008-305359

(51) Int. Cl.
*H04N 9/80* (2006.01)
*H04N 5/14* (2006.01)
*H04N 9/64* (2006.01)
*H04N 7/10* (2006.01)
*H04N 7/025* (2006.01)
*H04N 5/445* (2006.01)
*G06F 3/00* (2006.01)
*G06F 13/00* (2006.01)

(52) U.S. Cl. ........ 386/249; 386/250; 386/251; 386/225; 386/226; 386/333; 348/700; 348/701; 725/32; 725/22; 725/36; 725/42

(58) Field of Classification Search .................. 386/249, 386/250, 251, 225, 226, 333; 348/700–701; 725/32, 22, 36, 42
See application file for complete search history.

(56) References Cited

U.S. PATENT DOCUMENTS 5,987,210 A * 11/1999 Iggulden et al. ............. 386/239
2005/0223403 A1* 10/2005 Suito et al. ..................... 725/32

FOREIGN PATENT DOCUMENTS

| JP | 2002-016873 A | 1/2002 |
| JP | 2006-109126 A | 4/2006 |
| JP | 2007-049515 A | 2/2007 |
| JP | 2007-288759 A | 11/2007 |

OTHER PUBLICATIONS

Explanation of Non-English Language References.

* cited by examiner

*Primary Examiner* — Thai Tran
*Assistant Examiner* — Daquan Zhao
(74) *Attorney, Agent, or Firm* — Knobbe, Martens Olson & Bear LLP

(57) ABSTRACT

According to one embodiment, a video analyzer includes a still image detector, a characteristic detector, and a boundary position detector. The still image detector detects a still image in video frames of content including video and audio data, and create a still image group of substantially the same still images. The characteristic detector includes at least one of a monochrome detector that detects a monochrome video frame in the video frames of the content and a silence detector that detects a silent portion in which the sound volume of the audio data is lower than a predetermined threshold. The boundary position detector detects a position where the type of the content changes based on information on at least one of the monochrome video frame and the silent portion contained in a segment where the still image group is present and a segment where no still image group is present.

9 Claims, 7 Drawing Sheets

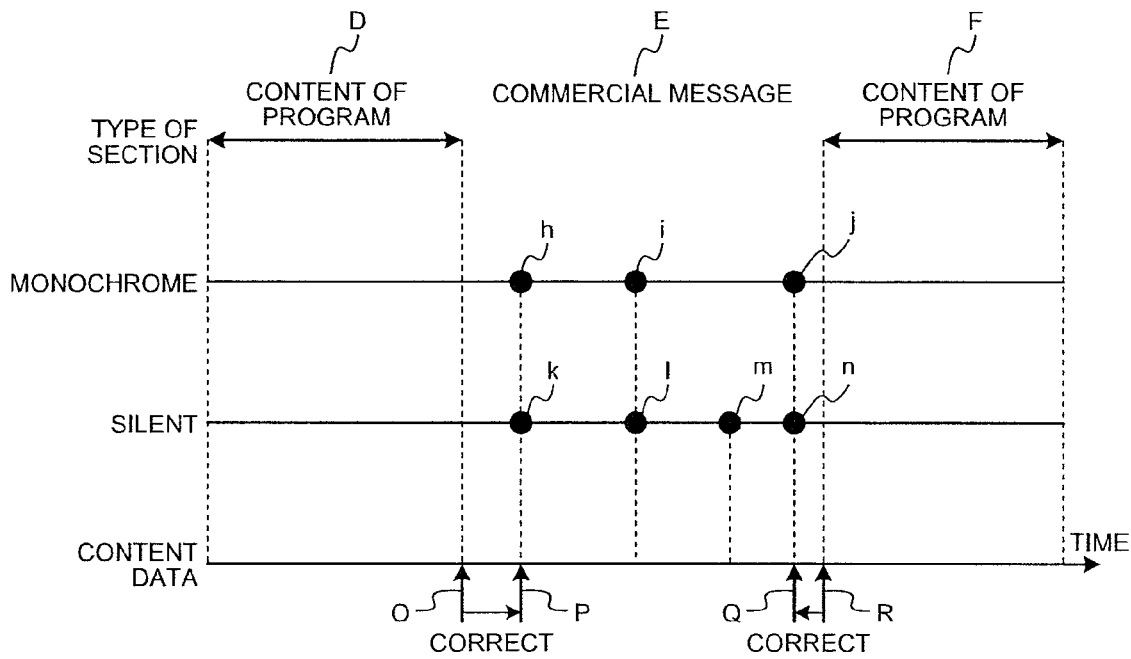
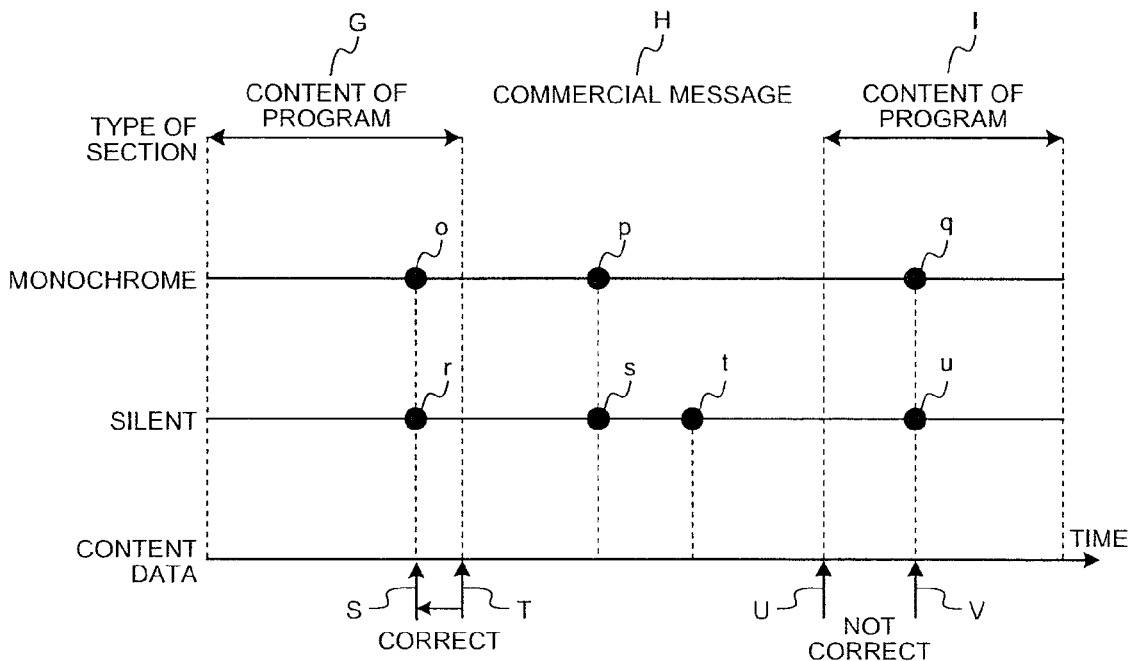

VIDEO ANALYZER AND COMPUTER PROGRAM PRODUCT

CROSS-REFERENCE TO RELATED APPLICATIONS

This application is based upon and claims the benefit of priority from Japanese Patent Application No. 2008-305359, filed Nov. 28, 2008, the entire contents of which are incorporated herein by reference.

BACKGROUND

1. Field

One embodiment of the invention relates to a video analyzer having a video analysis function used to skip commercial messages during the recording of a television program, and a computer product thereof.

2. Description of the Related Art

Generally, commercial television stations broadcast commercial messages as short advertisement broadcast before, after, or during a television (TV) program. In Japanese TV broadcasting, for example, the length of each commercial message is based on 15 seconds, and commercial messages of 15, 30, 60, etc. seconds are broadcast.

In recent years, there have been developed recorders with a commercial message (CM) skip function for not recording commercial messages during the recording of a TV program to thereby effectively record the TV program on a storage medium such as a magnetic disk. For example, Japanese Patent Application Publication (KOKAI) No. 2007-288759 discloses such a conventional recorder.

The conventional recorder determines a section in which images contain a still image such as a channel logo as the content of a TV program and others as commercial messages. With this, for TV broadcasting in, for example, European Countries, where commercial messages do not have regular lengths of 15, 30, etc. seconds as in Japan, the CM skip function can be implemented.

In actual TV broadcasting, however, even the content of a TV program includes a section that contains no still image such as a channel logo. Therefore, with the conventional recorder described above, even if of the content of a TV program, such a section that contains no still image may be erroneously determined as a commercial message.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 8 is an exemplary schematic diagram for explaining boundary correction in the embodiment;

FIG. 9 is another exemplary schematic diagram for explaining boundary correction in the embodiment.

DETAILED DESCRIPTION

Various embodiments according to the invention will be described hereinafter with reference to the accompanying drawings. In general, according to one embodiment of the invention, a video analyzer comprises a still image detector, a characteristic detector, and a boundary position detector. The still image detector is configured to detect a still image in video frames of content including video data and audio data, and create a still image group of substantially the same still images. The characteristic detector comprises at least one of a monochrome detector configured to detect a monochrome video frame in the video frames of the content, and a silence detector configured to detect a silent portion in which the sound volume of the audio data in the content is lower than a predetermined threshold. The boundary position detector is configured to detect a position where type of the content changes based on information on at least one of the monochrome video frame and the silent portion contained in a segment where the still image group is present and a segment where no still image group is present.

According to another embodiment of the invention, a computer program product embodied on a computer-readable medium and comprising code that, when executed, causes a computer to perform as a still image detector, a characteristic detector, and a boundary position detector. The still image detector is configured to detect a still image in video frames of content including video data and audio data, and create a still image group of substantially the same still images. The characteristic detector comprises at least one of a monochrome detector configured to detect a monochrome video frame in the video frames of the content, and a silence detector configured to detect a silent portion in which the sound volume of the audio data in the content is lower than a predetermined threshold. The boundary position detector is configured to detect a position where type of the content changes based on information on at least one of the monochrome video frame and the silent portion contained in a segment where the still image group is present and a segment where no still image group is present.

An embodiment of the invention will be described with reference to FIGS. 1 to 10. A video analyzer of the embodiment is described below by way of example as applied to a personal computer.

Figure 1:
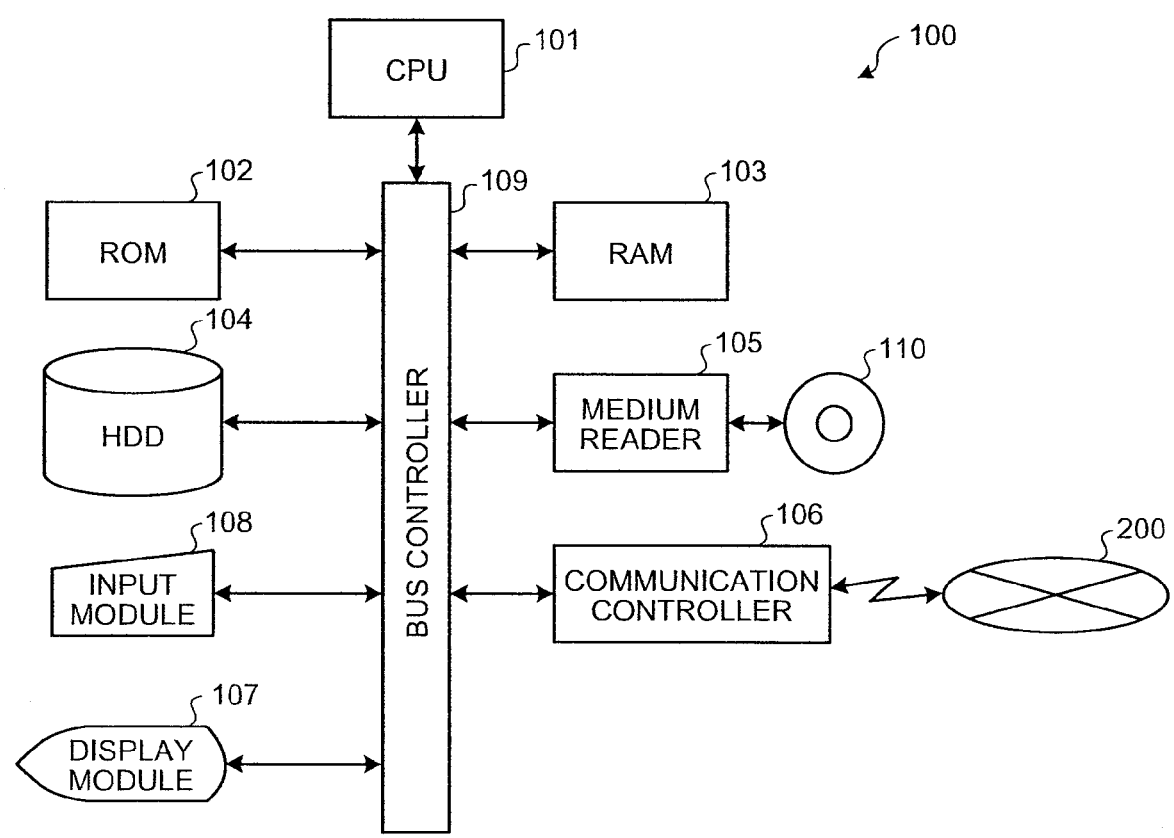
FIG. 1 is an exemplary block diagram of a video analyzer according to an embodiment of the invention.

FIG. 1 is a block diagram of a video analyzer 100 according to the embodiment. The video analyzer 100 comprises a central processing unit (CPU) 101, a read only memory (ROM) 102, a random access memory (RAM) 103, a hard disk drive (HDD) 104, a medium reader 105, a communication controller 106, a display module 107, and an input module 108, which communicates data through a bus controller 109. The CPU 101 performs information processing. The ROM 102 is read only and stores basic input/output system (BIOS) and the like. The RAM 103 is rewritable and stores various types of data in a rewritable manner. The HDD 104 functions as various types of databases as well as storing various programs. The medium reader 105 stores data in a storage medium 110. The medium reader 105 may be, for example, a DVD drive that distributes information to the outside and obtains information from the outside. The communication controller 106 communicates data with external devices via a network 200. The display module 107 comprises a liquid crystal display (LCD) that displays information to notify the user of progress in processing, results of processing, and the like. The input module 108 includes a keyboard, a mouse, and the like used by the user to input instructions, information, and the like for the CPU 101.

When the video analyzer 100 is turned on by the user, the CPU 101 invokes a program called loader stored in the ROM 102. Further, the CPU 101 loads a program called operating system (OS) for managing hardware and software of the computer from the HDD 104 into the RAM 103, and boots up the OS. According to user's operation, the OS invokes a program, and reads and stores data. For example, Windows (registered trademark) is known as a typical OS. Programs that run on the OS are referred to as application programs. The application programs need not necessarily run on a predetermined OS. The OS may perform part of various types of processing performed by the application programs. The application programs may be stored as part of a group of program files that constitutes predetermined application software or OS.

In the video analyzer 100, the HDD 104 stores a video analysis program as an application program. In this sense, the HDD 104 functions as a storage medium that stores the video analysis program.

Generally, an application program to be installed on the HDD 104 of the video analyzer 100 is stored in the storage medium 110. Examples of the storage medium 110 include various types of optical disks such as DVD, various types of magneto-optical disks, various types of magnetic disks such as flexible disk (FD), and various types of semiconductor memories. The application program stored in the storage medium 110 is then installed on the HDD 104. That is, the portable storage medium 110, including an optical information storage medium such as DVD and a magnetic information storage medium such as FD, may be a storage medium that stores the application program. The application program may also be downloaded from an external device via the network 200 through the communication controller 106, and then installed on the HDD 104.

In the video analyzer 100, when the video analysis program which runs on the OS is invoked, the CPU 101 performs various operations according to the video analysis program to correctively control the constituent elements of the video analyzer 100. As a salient feature of the embodiment, a description will be given of some operations performed by the CPU 101 of the video analyzer 100.

Figure 2:
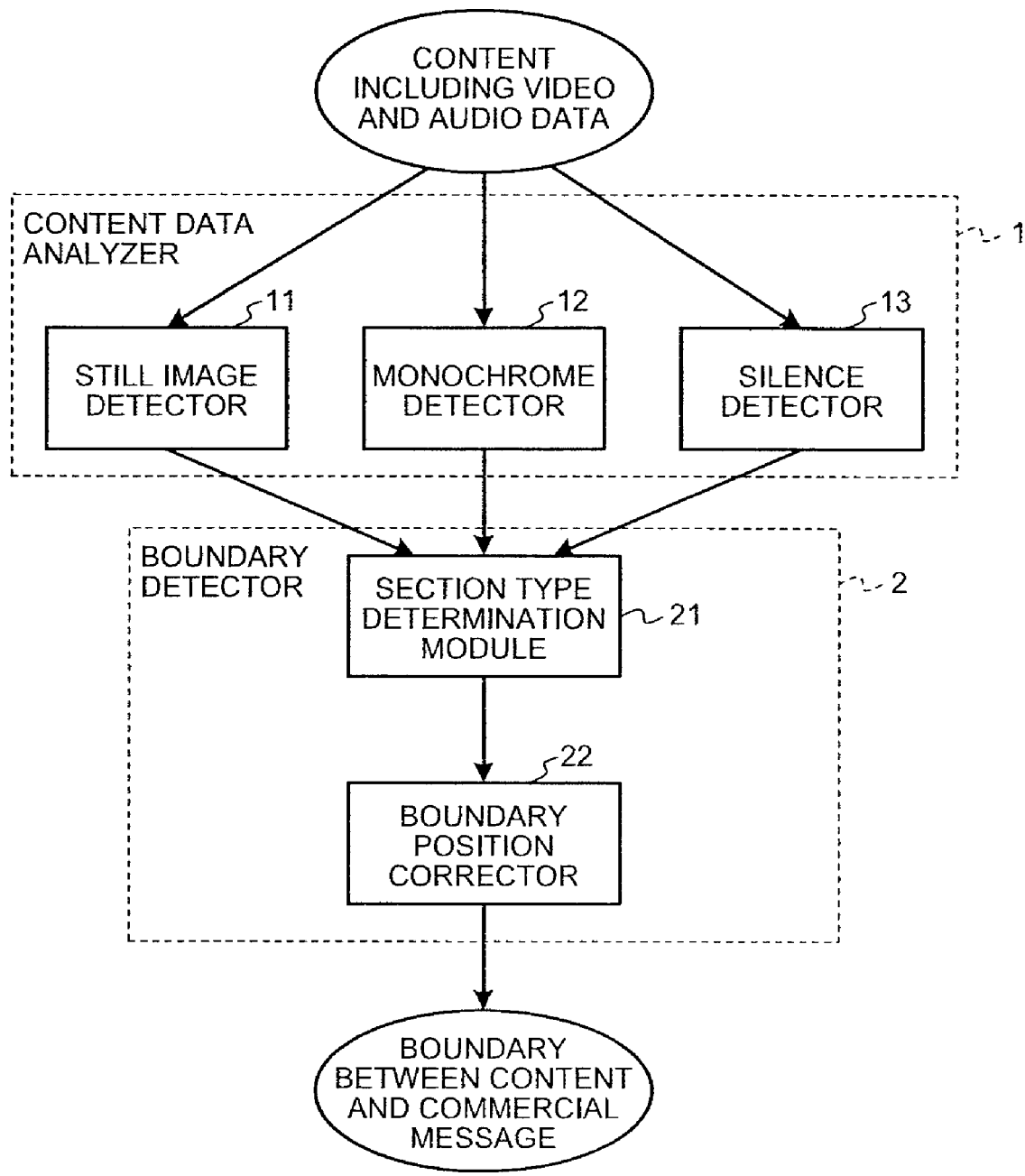
FIG. 2 is an exemplary schematic functional block diagram of the video analyzer in the embodiment.

FIG. 2 is a schematic functional block diagram of the video analyzer 100. As illustrated in FIG. 2, the video analyzer 100 implements a content data analyzer 1 and a boundary detector 2 by executing the video analysis program.

Described below is the constituent elements of the video analyzer 100 having salient features.

Upon receipt of video and audio data of content through an antenna (not illustrated) and a receiver (not illustrated), the content data analyzer 1 analyzes the video and audio data. More specifically, the content data analyzer 1 comprises a still image detector 11, a monochrome detector 12, and a silence detector 13. The still image detector 11 detects a section in which a still image is composited on the video of content. The monochrome detector 12 functions as a characteristic detector that detects a section formed of a monochrome video frame. The silence detector 13 also functions as a characteristic detector that detects a section in which the sound volume is lower than a predetermined threshold.

Figure 3:
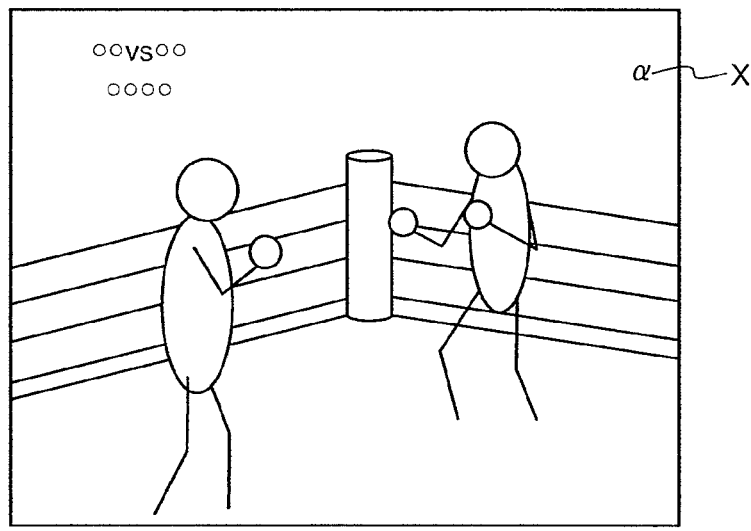
FIG. 3 is an exemplary plan view of a still image displayed in the embodiment.

As illustrated in FIG. 3, among still images that appear on video frames, the still image detector 11 detects a still image X displayed for a long time at a side of the screen. The still image X, which is continuously displayed for a predetermined period of time in the content of a TV program, is often the logo mark of the TV station or the name of the TV station. However, the still image that is continuously displayed in the content of a TV program is not limited to those mentioned above. The still image X (for example, a logo mark) can be detected by commonly known methods, such as, for example, the one disclosed in Japanese Patent Application Publication (KOKAI) No. 2007-274154.

Figure 4:
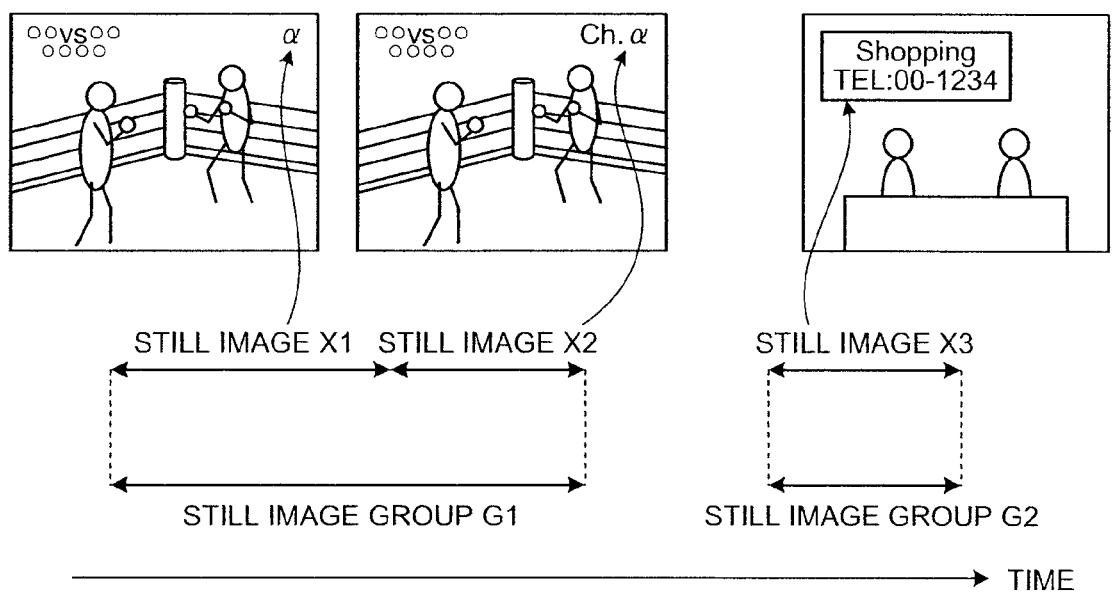
FIG. 4 is an exemplary schematic diagram of video frames extracted from content in the embodiment.
Figure 5:
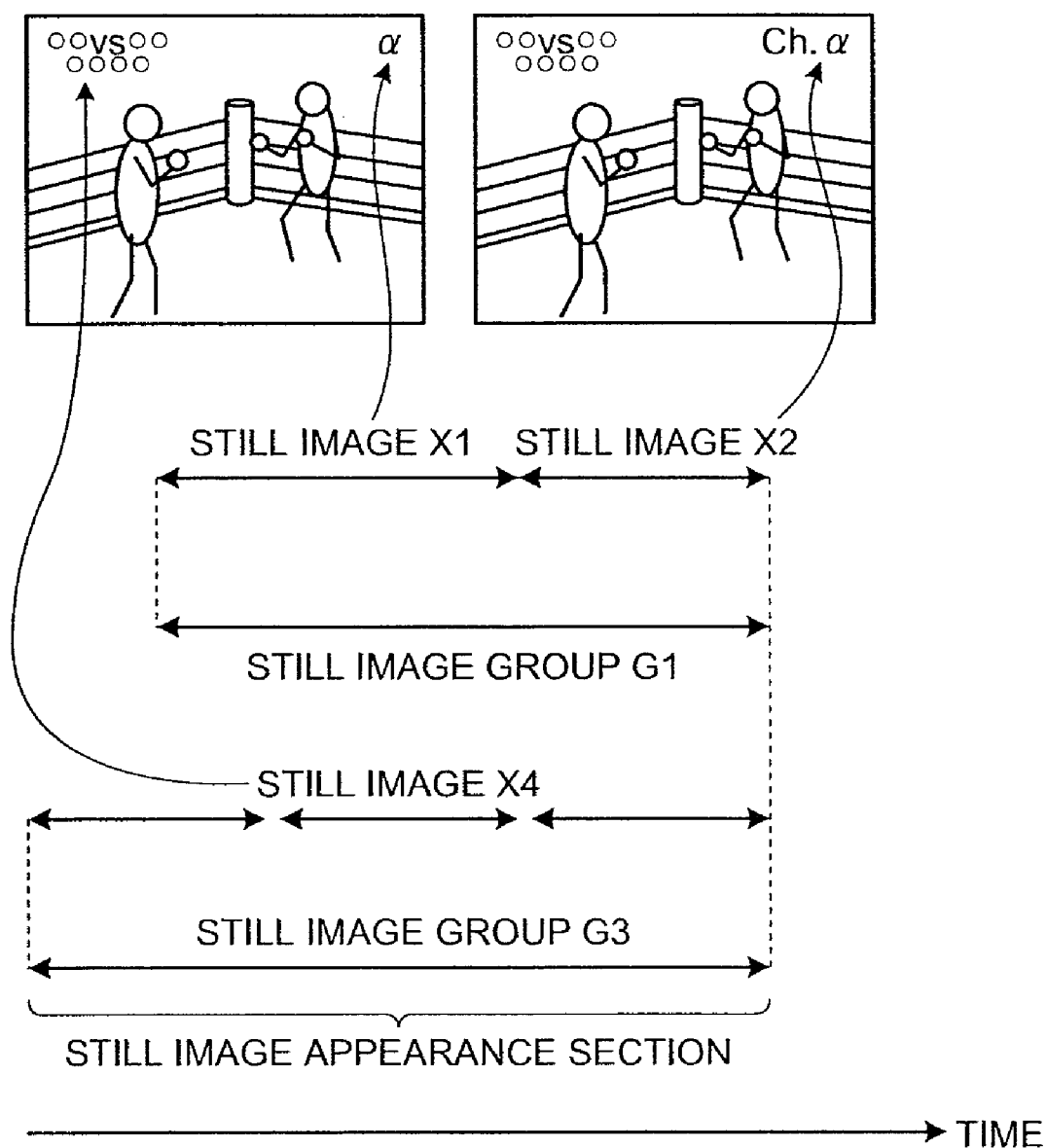
FIG. 5 is an exemplary schematic diagram of groups of still images in the embodiment.

Around the beginning or end of the content of a TV program where the type of video frames changes, it is often the case that the position or shape of a still image (for example, a logo mark) changes. Therefore, to detect a still image of the same type even if the position or shape thereof has changed, the still image detector 11 uses, in addition to the known methods of detecting a still image, the following method (see FIG. 4):

1. With respect to a plurality of detected still images (for example, logo marks) that appear at different times, the still image detector 11 compares the coordinates of positions where the still images appear. In the example of FIG. 4, three video frames are extracted from content. In the video frames illustrated in FIG. 4, still images X1 and X2 represent the logo mark of a TV station. The still images X1 and X2 do not appear at the same time but are displayed at nearly the same position. As with this case, when the difference between the positions of the still images X1 and X2 is equal to or less than a predetermined threshold, even if the still image X1 has changed to the still image X2, they are grouped as still images that appear at the same position. Thus, the still images X1 and X2 belong to a still image group G1. On the other hand, since a still image X3 appears at a different position, it belongs to a different still image group G2.

2. The still image detector 11 calculates a time period for which each of the still image groups is displayed. If a time period for which a still image group is displayed is less than a predetermined threshold, the still image detector 11 deletes the still image group. In the example of FIG. 4, the still image X3 appears in a commercial message. In general, a commercial message is broadcast for a short period of time, and therefore, a time period for which the still image group G2 is displayed is less than the predetermined threshold (i.e., the still image group G2 is displayed for a short period of time). Accordingly, the still image detector 11 determines that the still image group G2 represents a still image that appears in a commercial message, and deletes the still image group G2. For example, if the time period for which the still image group G2 is displayed is one minute or less, the content data analyzer 1 determines that the still image group G2 represents a still image that appears in a commercial message. With this, even when detecting a still image in a commercial message, the still image detector 11 does not erroneously determine the still image as the one in the content of a TV program.

3. The still image detector 11 combines detected still image groups. More specifically, in the example of FIG. 5, the still images X1 and X2 constitute the still image group G1, and a still image X4 constitutes a still image group G3. The still image detector 11 combines the still image groups G1 and G3, which appear at the same time or at overlapping times, to create a still image appearance section, i.e., a time period for which the still image groups are displayed. Incidentally, in the example of FIG. 5, the still image X4 belonging to the still image group G3 appears earlier than the still image X1 belonging to the still image group G1 because the logo mark of the TV station is not displayed for a while at the beginning of the content of a TV program.

The monochrome detector 12 analyzes color information on a video frame to determine whether the video frame is a monochrome video frame (for example, a black frame representing a full black screen). This is because, in TV broadcasting in European Countries and the like, it is often the case that a "black frame" is inserted at the start of a commercial message. The monochrome video frame is not limited to such a black frame, and it may be a blue frame or a white frame. Although the monochrome detector 12 may analyze the entire area of a video frame, it may analyze only the center area of the frame because edges of an image often contain noise.

The silence detector 13 analyzes the sound volume of content to detect a silent state (a section in which the sound volume is lower than a predetermined threshold). The sound volume may be calculated based on a PCM level after decoding or audio spectrum information before decoding. The method of calculating the sound volume is not limited to those mentioned above. The sound volume is calculated because, in TV broadcasting in European Countries and the like, it is often the case that a silent (or a nearly silent) state is detected at the start of a commercial message.

Incidentally, when the silence detector 13 performs processing after the processing of the monochrome detector 12, the detection can be performed with higher accuracy.

The boundary detector 2 will be then described. The boundary detector 2 calculates the position where the type of content data changes to another based on information obtained as the results of the analyses performed by the content data analyzer 1. In the embodiment, the types of content data include, but are not limited to, the content of a TV program and a commercial message. The boundary detector 2 comprises a section type determination module 21 and a boundary position corrector 22.

Figure 6:
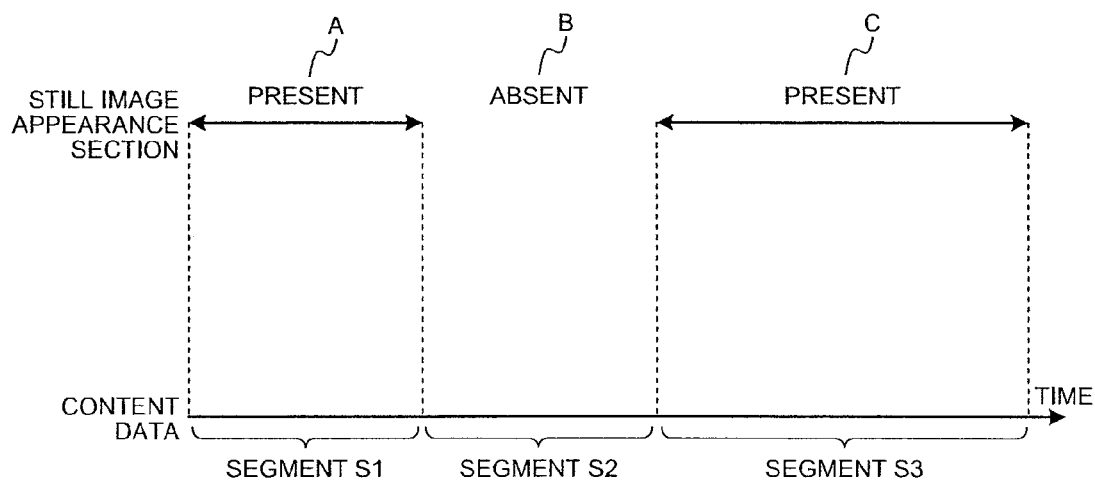
FIG. 6 is an exemplary schematic diagram for explaining how to divide content into segments in the embodiment.

As illustrated in FIG. 6, the section type determination module 21 divides content into a plurality of segments (S1, S2, and S3) based on sections A and C in which a still image appears in the content and a section B in which a still image does not appear.

With respect to each section in which the still image detector 11 detects a still image or detects no still image, the section type determination module 21 determines the type of content data (the content of a TV program or a commercial message) from video and audio data contained in the section.

Figure 7:
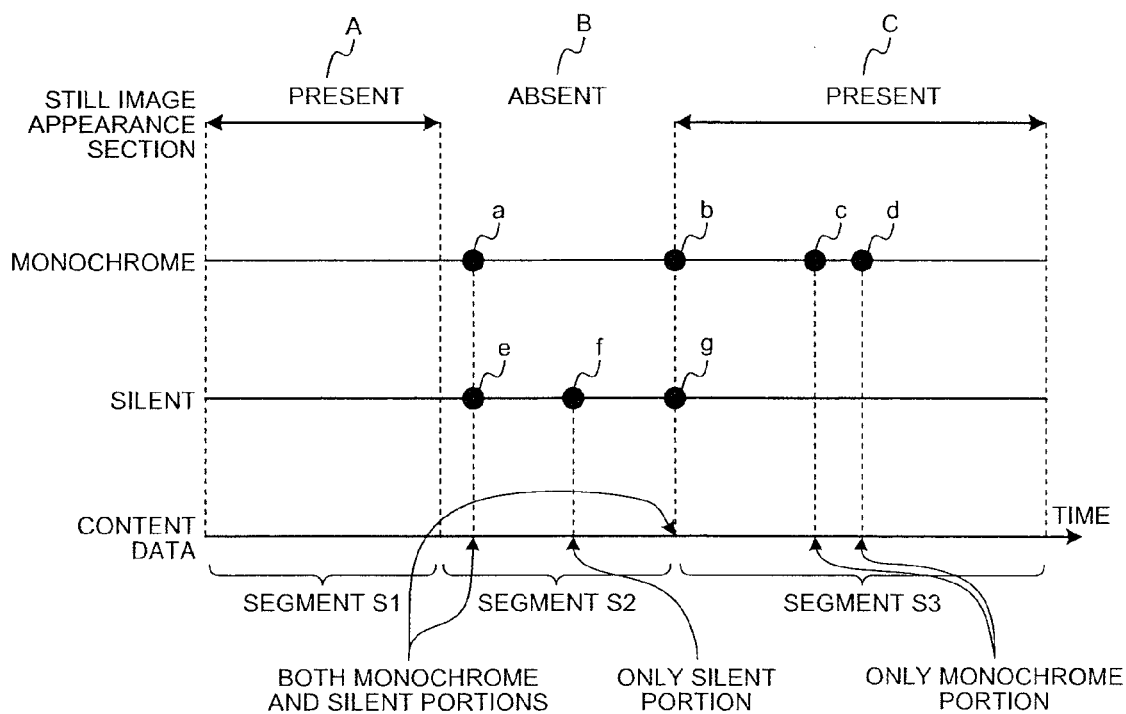
FIG. 7 is an exemplary schematic diagram for explaining how to determine the type of video in the embodiment.

A detailed description will be given of how to determine the type of video (content data). Specifically, as illustrated in FIG. 7, the types of segments (S1, S2, and S3) are calculated based on video and audio data contained in the segments such as monochrome portions (a, b, c, and d) and silent portions (e, f, and g). In FIG. 7, the segments S1 and S3, in which a still image is displayed, are likely to be of the content of a TV program, while the segment S2, in which monochrome and silent portions frequently appear, is likely to be of a commercial message. With these characteristics, the section type determination module 21 calculates the likelihood that a segment represents the content of a TV program based on the presence/absence of a still image in the segment, and the number of monochrome and silent portions in the segment.

For example, the likelihood that a segment represents the content of a TV program is calculated as follows:

1. When a still image and monochrome and silent portions are both present in a segment, the number of the monochrome and silent portions per one minute is calculated. The calculated number is compared with a threshold to determine whether the segment is likely to represent the content of a TV program or a commercial message. If the number of the monochrome and silent portions exceeds the threshold, the segment is determined to represent a commercial message (the likelihood that the segment represents the content of a TV program is 0%), and otherwise, the segment is determined to represent the content of a TV program.

2. When monochrome and silent portions are present but no still image is present in a segment, the segment is determined to represent a commercial message including the content of a TV program, and the likelihood that the segment represents the content of a TV program is set to 20%.

3. Regardless of the presence/absence of a still image in a segment, when no monochrome and silent portion is present in the segment, the likelihood that the segment represents the content of a TV program is set to 100%.

4. After calculating the likelihood that each segment represents the content of a TV program, the boundary between adjacent segments at which the likelihood changes significantly is regarded as the boundary between the content of a TV program and a commercial message.

Although a still image is generally displayed in the content of a TV program, it is sometimes displayed in a commercial message at the same position for a long period of time. For example, There is a case that the logo mark of a TV station is continuously displayed in a commercial message advertising a TV program broadcast by the TV station. Even in such a case, a segment can be correctly determined to represent a commercial message based on information such as the number of monochrome and silent portions.

The boundary position corrector 22 corrects the position (boundary) where the type of content data changes to a position determined to be more appropriate based on information including the type of content data determined by the section type determination module 21, a monochrome video frame detected by the monochrome detector 12, and a silent (or a nearly silent) state detected by the silence detector 13.

In the following, a detailed description will be given of how the boundary position corrector 22 corrects the position (boundary) where the type of content data detected by the section type determination module 21 changes to a correct boundary between the content of a TV program and a commercial message. Specifically, as illustrated in FIG. 8, a still image is often displayed such that it shifts from a correct boundary between the content of a TV program and a commercial message. That is, a still image often disappears from the content of a TV program just before a commercial message, and accordingly, it is often the case that the boundary between segments basically shifts to the side of the content of a TV program. In other words, the boundary from the content of a TV program to a commercial message tends to shift forward from a correct boundary, while the boundary from a commercial message to the content of a TV program tends to shift backward from a correct boundary. In the example of FIG. 8, sections D and F are determined to represent the content of a TV program, and a section E is determined to represent a commercial message. Incidentally, the sections D, E and F may include a plurality of segments of the same type. In FIG. 8, the content of a TV program switches to a commercial message at a position (boundary) O, and a commercial message switches to the content of a TV program at a position (boundary) R, which are detected based on the presence/absence of a still image. Monochrome portions h, i, and j and silent portions k, l, m and n are detected in the sections. In this example, the boundary position corrector 22 pays attention to positions P and Q where the monochrome and silent portions are detected at the same time. The position P is a position where monochrome and silent portions are detected at the time closest to a position O, and is located on the side of a commercial message from the position O. The position Q is a position where monochrome and silent portions are detected at the time closest to a position R, and is located on the side of a commercial message from the position R. The boundary between the content of a TV program and a commercial message is characterized in video and audio data such as the coincident appearance of monochrome and silent portions. The boundary position corrector 22 detects a correct boundary for the one from the content of a TV program to a commercial message based on video and audio characteristics subsequent thereto. Meanwhile, the boundary position corrector 22 detects a correct boundary for the one from a commercial message to the content of a TV program based on video and audio characteristics prior thereto. Thus, the boundary position corrector 22 replaces the positions O and R with the positions P and Q, respectively, as new boundaries.

With this, even if a slight shift occurs when a boundary is detected based only on a still image, the boundary can be detected more accurately.

With reference to FIG. 9. a description will then be given of the case where the time at which monochrome and silent portions are detected is located on the side of the content of a TV program from a boundary detected based on the presence/absence of a still image.

In the example of FIG. 9, sections G and I are determined to represent the content of a TV program, and a section H is determined to represent a commercial message. Incidentally, the sections G, H and I may include a plurality of segments of the same type. In FIG. 9, the content of a TV program switches to a commercial message at a position (boundary) T, and a commercial message switches to the content of a TV program at a position (boundary) U, which are detected based on the presence/absence of a still image. Monochrome portions o, p, and q and silent portions r, s, t and u are detected in the sections. In this example, the boundary position corrector 22 pays attention to positions S and V where the monochrome and silent portions are detected at the same time. The position S is a position where monochrome and silent portions are detected at the time closest to a position T, and is located on the side of the content of a TV program from the position T. The position V is a position where monochrome and silent portions are detected at the time closest to a position U, and is located on the side of the content of a TV program from the position U. Since video and audio characteristics are often detected on the side of a commercial message, it is necessary to be careful when video and audio characteristics are detected on the opposite side as illustrated in FIG. 9. The boundary position corrector 22 calculates a time interval between the positions S and T and between the positions U and V. If the time interval is equal to or less than a threshold, the boundary position corrector 22 determines the time at which the video and audio characteristics are detected as a new boundary. In the example of FIG. 9, the positions S and T are close in time to each other. Therefore, the boundary position corrector 22 determines, for example, that a logo mark is displayed in a commercial message at the same position as in the content of a TV program. Thus, the boundary position corrector 22 replaces the position T with the position S as a new boundary. On the other hand, the positions U and V are distant in time from each other more than the threshold. Therefore, the boundary position corrector 22 does not set the position V as a new boundary and maintains the position U.

While, in the example of FIG. 8 or 9, the boundary is corrected to the time at which monochrome and silent portions are detected at the same time, it may be corrected to the time at which either a monochrome or silent portion is detected.

Figure 10:
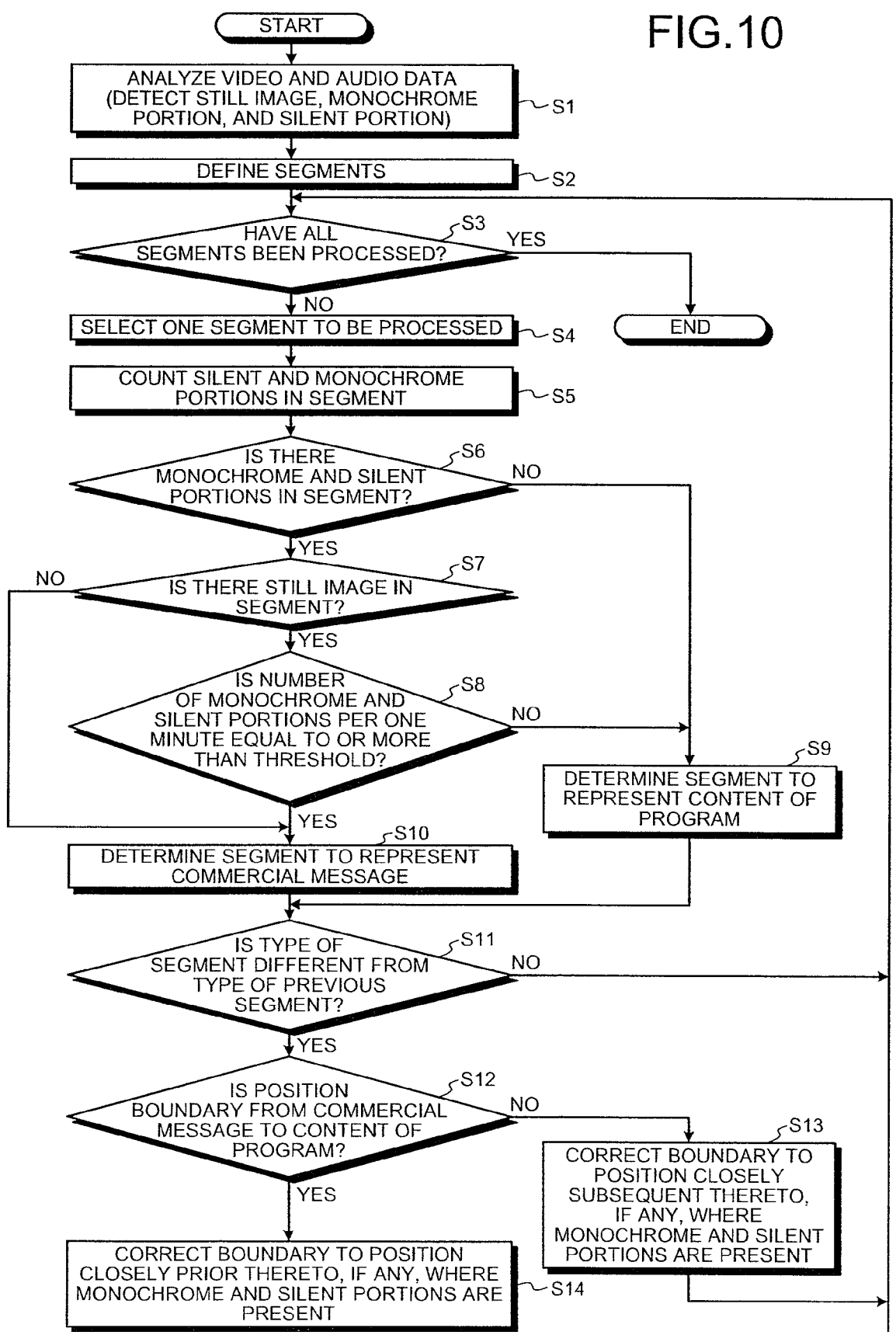
FIG. 10 is an exemplary flowchart of a video analysis process in the embodiment.

With reference to FIG. 10, a description will be given of a video analysis process performed by the CPU 101 of the video analyzer 100.

Upon receipt of content including video and audio data through the antenna (not illustrated) and the receiver (not illustrated), the content data analyzer 1 analyzes the video and audio data (S1). More specifically, the still image detector 11 detects a still image. The monochrome detector 12 detects a monochrome portion. The silence detector 13 detects a silent portion.

The section type determination module 21 defines segments based on sections where a still image is present and where no still image is present (S2).

If all the segments have not yet been processed (No at S3), one segment to be processed is selected (S4). The section type determination module 21 counts the number of silent portions (sections in which the sound volume is lower than a predetermined threshold), the number of monochrome portions, and the number of monochrome and silent portions (S5) in the segment.

If there is no monochrome and silent portion in the segment (No at S6), the section type determination module 21 determines that the segment represents the content of a TV program (S9).

On the other hand, there are monochrome and silent portions (Yes at S6), but there is no still image in the segment (No at S7), the section type determination module 21 determines that the segment represents a commercial message (S10).

If there are monochrome and silent portions (Yes at S6) as well as a still image in the segment (Yes at S7), the section type determination module 21 calculates the number of the monochrome and silent portions per one minute, and compares the calculated number with a threshold. If the calculated number is equal to or more than the threshold (Yes at S8), the section type determination module 21 determines that the segment represents a commercial message (S10). On the other hand, if the calculated number is less than the threshold (No at S8), the section type determination module 21 determines that the segment represents the content of a TV program (S9).

While, in the example of FIG. 10, the likelihood that a segment represents the content of a TV program is calculated as 100% or 0%, it may be more finely calculated.

Having determined the type of the segment, the type of the segment is compared with the type of a previous segment determined immediately before this segment (S11).

When the type of the segment is different from that of the previous segment (Yes at S12), the boundary position corrector 22 corrects the position (boundary) where the type of content data changes to a position determined to be more appropriate. More specifically, if the position is a boundary from a commercial message to the content of a TV program (Yes at S12), the boundary position corrector 22 corrects the position (boundary) to a position closely prior thereto, if any, where monochrome and silent portions are detected (S14).

On the other hand, if the position is a boundary from the content of a TV program to a commercial message (No at S12), the boundary position corrector 22 corrects the position (boundary) to a position closely subsequent thereto, if any, where monochrome and silent portions are detected (S13).

The process from S4 to S14 is repeated until all the segments are processed (Yes at S3).

While, in the example of FIG. 10, the boundary is corrected to the time at which monochrome and silent portions are detected at the same time, it may be corrected to the time at which either a monochrome or silent portion is detected.

In addition, the above process need not necessarily be performed with respect to each segment. The entire data from the beginning to the end of content may be stored to be processed together. The above process may also be performed each time necessary data are stored by detecting segments.

As described above, according to the embodiment, in addition to detection of a section where a still image group of the substantially same still images appears in video frames of content and a section where no still image is present, the position where the type of content data changes is detected based also on information on at least one of a monochrome video frame among the video frames of the content and a silent section in which the sound volume of audio data in the content is lower than a predetermined threshold. Thus, in TV broadcasting, even when a TV program contains a part where a still image such as a channel logo is not present, the position where the type of content data changes to another (the content of a TV program or a commercial message) can be accurately detected.

While the video analyzer 100 of the embodiment is described above as applied to a personal computer, this is by way of example and not by way of limitation. The video analyzer 100 of the embodiment may be applied to a television, an HDD recorder, a one-segment broadcasting receiver, and the like.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video analyzer comprising:
   a still image detector configured to detect a still image continuously displayed for a predetermined time in video frames of content comprising video data and audio data, and to group a segment in which substantially identical detected still images appear as a still image group;
   a characteristic detector configured to detect a monochrome video frame in the video frames of the content using a monochrome detector, or to detect a silent portion in which sound volume of the audio data in the content is lower than a first predetermined threshold using a silence detector; and
   a boundary position detector configured to detect a position where a type of the content changes based on information on at least one of the monochrome video frame and the silent portion in the segment comprising the still image group and/or a segment without the still image group,
   wherein the still image detector is further configured to detect a plurality of still images that appear at different times, to compare coordinates of positions where the still images appear, and to group a segment in which still images with a difference between the positions of the still images that is equal to or smaller than a second predetermined threshold appear as the still image group, when the difference between the positions is equal to or smaller than the second predetermined threshold, and
   wherein the video analyzer is at least partially implemented using a processor.

2. The video analyzer of claim 1, wherein the boundary position detector comprises:
   a section type determination module configured to determine the type of the content based on the video data and the audio data with respect to each of the segment comprising the still image group and the segment without the still image group; and a boundary position corrector configured to correct the position where the type of the content changes to a position determined to be more appropriate based on the type of the content determined with respect to each segment, and the information on at least one of the monochrome video frame and the silent portion.

3. The video analyzer of claim 2, wherein the section type determination module is configured to determine the type of the content based on either presence or absence of a still image in each of the segments, and the information on at least one of the monochrome video frame and the silent portion in each of the segments.

4. The video analyzer of claim 2, wherein the boundary position corrector is configured to prioritize the information on at least one of the monochrome video frame and the silent portion subsequent to a boundary from the segment comprising the still image group to the segment without the still image group, and the boundary position corrector is configured to prioritize the information on at least one of the monochrome video frame and the silent portion prior to the boundary with respect to a boundary from the segment without the still image group to the segment comprising the still image group.

5. The video analyzer of claim 2, wherein the boundary position corrector is configured to calculate a time interval between a position of at least one of the monochrome video frame and the silent portion and a boundary between the segment comprising the still image group and the segment without the still image group when at least one of the monochrome video frame and the silent portion is present in the segment where the still image group is present, and configured to set the position of at least one of the monochrome video frame and the silent portion as a new boundary when the time interval is equal to or shorter than a third predetermined threshold.

6. The video analyzer of claim 1, wherein the characteristic detector is configured such that after the monochrome detector detects the monochrome video frame, the silence detector detects the silent portion.

7. The video analyzer of claim 1, wherein the still image detector is configured to calculate a duration of the still image group and to delete the still image group when the duration is shorter than a predetermined threshold.

8. The video analyzer of claim 1, wherein the still image detector is configured to combine still image groups comprising overlapping times into a still image appearance section.

9. A computer program product embodied on a computer-readable non-transitory medium and comprising code that, when executed, causes a computer to perform as:
   a still image detector configured to detect a still image continuously displayed for a predetermined time in video frames of content comprising video data and audio data, and to group a segment in which substantially identical detected still images appear as a still image group;

a characteristic detector configured to detect a monochrome video frame in the video frames of the content by a monochrome detector, or configured to detect a silent portion in which sound volume of the audio data in the content is lower than a first predetermined threshold by a silence detector; and a boundary position detector configured to detect a position where type of the content changes based on information on at least one of the monochrome video frame and the silent portion in the segment comprising the still image group and/or a segment without the still image group, wherein the still image detector is further configured to detect a plurality of still images that appear at different times, to compare coordinates of positions where the still images appear, and to group a segment in which still images with a difference between the positions of the still images that is equal to or smaller than a second predetermined threshold appear as the still image group, when the difference between the positions is equal to or smaller than the second predetermined threshold.

* * * * *